106-18.23                SR
XR       3,779,978

United 3,779,978
Patented Dec. 18, 1973

1

3,779,978
POLYBROMO-CYCLOALIPHATIC ETHERS AS
FLAME RETARDANT PLASTICIZERS
Paul M. Kerschner, Trenton, N.J., assignor to Cities
Service Company, New York, N.Y.
No Drawing. Original application Dec. 29, 1967, Ser. No.
694,423, now Patent No. 3,631,112. Divided and this
application June 4, 1971, Ser. No. 150,212
Int. Cl. C08f 45/42
U.S. Cl. 260—33.2 R                        6 Claims

ABSTRACT OF THE DISCLOSURE

A unique group of high boiling water insoluble polyhaloalkyl and cycloalkyl ethers is described, all of which are useful as external plasticizers and flame retarders for thermoplastic organic polymers, such as polyethylene, polystyrene and polymethylmethacrylate.

These plasticizer/flame retarder compositions are advantageously produced by adding a solution of halogen, such as bromine, in a lower aliphatic alcohol to a multi-unsaturated aliphatic or cycloaliphatic hydrocarbon and then adding sufficient water to the reaction mixture to separate the desired product as an insoluble lower liquid phase.

CROSS REFERENCE TO RELATED APPLICATION

This application is a division of copending application S.N. 694,423, filed Dec. 29, 1967, now U.S. Pat. 3,631,112.

BACKGROUND OF THE INVENTION

(1) Field of the invention

This invention relates to (A) a unique group of polyhaloalkyl ethers and cycloalkyl ethers containing from about 5 to about 28 carbon atoms and from 2 to 7 halogen substituents, preferably bromine, which possess high melting points and low water solubility, (B) processes for the production of such compounds by the reaction of a multi-unsaturated aliphatic or cycloaliphatic hydrocarbon with halogen and a lower aliphatic alcohol and (C) plasticized self-extinguishing thermoplastic organic polymers containing such compounds.

(2) Description of the prior art

The use of bromoalkanes and polybromoalkanes as flame retarders in thermoplastic organic polymers is well known. While many of these prior art compounds are effective for this purpose at low concentrations and possess a desirably high melting point and low water solubility, polymers containing these materials are often too brittle for low temperature applications. This condition can often be remedied by employing such brominated compound in conjunction with a conventional plasticizer, such as a phosphate ester. The presence of such multiple additives not only increases the cost of the polymer composition, but may, under severe conditions, also result in degradation of the polymeric chain induced by interaction or decomposition products of these additives.

SUMMARY

It has now been discovered that thermoplastic polymers can be both plasticized and rendered flame retardant by the incorporation therein of a novel, highly stable polyhaloalkyl ether or cycloalkyl ether of the formula:

$$X_aR(OR')_b$$

wherein X is a halogen group, R is a saturated aliphatic or cycloaliphatic hydrocarbon group containing from about 4 to about 20 carbon atoms, R' is an aliphatic or cycloaliphatic group, $a$ is 2 to 7, $b$ is 1 to 4, the ratio of $a$ to $b$ is at least 1 and the sum of $a$ and $b$ is an even integer from 4 to 8. It has also been found that such polyhaloalkyl ethers and cycloalkyl ethers can be obtained in high yield and purity by reacting a multi-unsaturated aliphatic or cycloaliphatic hydrocarbon containing from about 4 to about 20 carbon atoms with a solution of halogen in a liquid aliphatic or cycloaliphatic alcohol and then adding sufficient water to the reaction mixture to separate the desired compound as an insoluble lower liquid phase.

DESCRIPTION OF THE PREFERRED EMBODIMENTS

As indicated above, the polyhaloalkyl ethers and cycloalkyl ethers of this invention, having the formula $$X_aR(OR')_b,$$

are stable, high boiling materials having low water solubility. These compounds, and particularly those in which the halogen is bromine, have been found to function effectively in low concentrations in thermoplastic organic polymers as external plasticizers and flame retarders. Because of their unique physical properties, these materials are highly resistant to being lost through leaching, vaporization or decomposition when incorporated in the thermoplastic polymer, thereby permitting the use of such polymer in applications where it is exposed to severe conditions of water, sunlight and temperature. These compounds are advantageously employed in quantities of from about 0.1% to about 10% by weight of the polymer. They have been found to be particularly effective in plasticizing and imparting flame retardancy to readily flammable hydrocarbon polymers such as polyethylene, polypropylene, polystyrene, high impact polystyrene and polybutadiene, as well as to other vinyl polymers such as polymethylmethacrylate, polyacrylamide, ABS or even the difficultly flammable polyvinyl chloride. In addition to their use in vinyl polymers, these compounds may be employed as external plasticizers and flame retarders in any other organic polymer, such as the polyamides, polyesters and polyurethanes.

Aliphatic compounds corresponding to the above formula in which R is a saturated aliphatic hydrocarbon group containing from about 8 to about 12 carbon atoms, R' is a saturated aliphatic group containing from about 1 to about 8 carbon atoms, X is bromine group and the sum of $a$ and $b$ is an even integer from 4 to 6, represent a preferred group of compounds of this invention. Exemplary of such compounds are methoxy-tribromooctane, ethoxy-tribromooctane, ethoxy - pentabromo - methylheptane, ethylhexoxypentabromooctane, ethoxy - pentabromodecane, diethoxy-dibromooctane, diethoxy - tetrabromodecane and triethoxy-tribromodecane. The polybromoalkyl ethers in which R contains from 8 to 10 carbon atoms, $b$ is 1 and the sum of $a$ and $b$ is 6 are particularly effective flame retardants.

Of the cycloaliphatic compounds of this invention, a preferred group is represented by the polybromocycloalkyl ethers of the above formula in which R is a saturated cycloaliphatic hydrocarbon group containing a 5 to 16 member carbocyclic ring. Examples of such compounds include methoxy-tribromocyclooctane, ethoxy-tribromocyclooctane, ethylhexoxy - tribromocyclodecane, ethoxypentabromocyclododecane, diethoxy-dibromocyclooctane, diethoxytetrabromocyclododecane and triethoxy - tribromocyclododecane. As in the case of the aliphatic compounds described above, maximum flame retardancy is possessed by those compounds in which $b$ is 1. A particularly effective, and therefore preferred, group of cycloaliphatic compounds is that in which all of the bromine and alkoxy or cycloalkoxy groups are present as substituents on the carbocyclic ring (especially one containing 8 to 12 members), b is 1 and the sum of a and b is 4 or 6.

The compounds of this invention can be produced in high yield and purity by reacting a multi-unsaturated aliphatic or cycloaliphatic hydrocarbon containing from about 4 to about 20 carbon atoms with a halogen, preferably bromine, in a reactive lower aliphatic or cycloaliphatic alcohol solvent, such as methanol, ethanol, cyclohexanol or 2-ethylhexanol. This reaction is advantageously conducted under substantially anhydrous conditions at a temperature of from about 10° C. to about 50° C., preferably at about room temperature. Reaction temperatures above 60° C. or below −10° C. are also operative; however there are few advantages to compensate for the low reaction rates or high halogen losses which often accompany normal pressure reactions conducted at these extreme temperatures.

In a preferred embodiment of this process, by-product formation is minimized by slowly adding the solvent solution of halogen to the unsaturated hydrocarbon, thereby maintaining less than a stoichiometric quantity of halogen in the reaction zone during a major portion of the reaction period. The bulk of the by-products that are formed are insoluble in the reaction mixture and are advantageously removed by conventional means prior to the addition of sufficient water to effect total phase separation between the solvent and the polybromoalkyl ether or cycloalkyl ether product.

The relative proportions of mono and polyether product obtained can, to a limited degree, be controlled by the relative quantities of bromine and alcohol present during the reaction. In general, mono ether product formation is favored at higher mole ratios of bromine to alcohol, with increasing quantities of product containing more than one ether group being formed as this ratio is decreased.

The quality of reactive alcohol solvent that is employed may be varied over a wide range. Since a function of the alcohol is to provide a mobile reaction mixture, as well as being a reactant, it is usually advantageous to employ a volume of alcohol that is at least as large and preferable several times as large as that of the unsaturated hydrocarbon.

Among the multi-unsaturated aliphatic or cycloaliphatic hydrocarbons which are suitable for use in this process to produce the polyhaloalkyl ethers and cycloalkyl ethers of this invention are 1,3-butadiene, isoprene, piperylene, 1,4-hexadiene, 1,7-octadiene, 1,3-cyclopentadiene, 1,3-cyclohexadiene, 1,4-divinylcyclohexane, 4-vinyl-cyclohexene, 1,5-cyclooctadiene, 1,6-cyclodecadiene, 1,5-cyclododecadiene, 4-methyl-1,3,6-heptatriene, 1,4,7-octatriene, 1,4,9-decatriene, 1,5,9-cyclododecatriene, 1,5,9-trimethyl-1,5,9-cyclododecatriene, 1,3,5,7-cyclooctatetraene and 1,5,9,13-cyclohexadecatetraene.

The numerous advantages inherent in the practice of the instant invention will be apparent to those skilled in the art from an examination of the following examples.

EXAMPLE I

A clean dry five liter flask equipped with a stirrer is charged with 3,000 grams of absolute ethanol and 250 grams of 1,5-cyclooctadiene. The contents of the flask are heated to 37° C. and 750 grams of bromine are added dropwise over a two-hour period. Stirring is continued for an additional five minutes and the entire reaction mixture is poured into a large volume of aqueous sodium bisulfite. The mixture is permitted to settle and the lower oily liquid and solid phases are separated and dried. These separated materials are then added to a large volume of absolute ethanol and centrifuged to remove insoluble solids. The ethanol is then evaporated over a steam bath and the remaining liquids vacuum distilled, yielding a fraction having a melting point of 103.5° C. to 105° C. and a boiling point of about 340° C., which is identified as ethoxy-tribromocyclooctane.

EXAMPLE II

The procedure of Example I is repeated employing 125 grams of 1,5-cyclooctadiene and 375 grams of bromine, the bromine being introduced as a solution in 1,000 grams of absolute ethanol. Work up of the reaction mixture as in Example I yields two major fractions which are identified as ethoxy-tribromocyclooctane and diethoxy-dibromocyclooctane.

EXAMPLE III

The procedure of Example II is repeated employing, in place of cyclooctadiene, 125 grams of 1,5,9-cyclododecatriene. Vacuum distillation of the liquid product yields three major fractions which are identified as ethoxy-pentabromocyclododecane, diethoxy-tetrabromocyclododecane and triethoxy-tribromocyclododecane.

EXAMPLE IV

The procedure of Example II is repeated employing 110 grams of 1,4,9-decatriene in place of cyclooctadiene. Vacuum distillation of the liquid product yields three major fractions which are identified as ethoxy-pentabromodecane, diethoxy-tetrabromodecane and triethoxy-tribromodecane.

EXAMPLE V

The procedure of Example I is repeated employing methanol in place of ethanol as the reaction solvent, yielding methoxy-tribromocyclooctane.

EXAMPLE VI

A clean dry five liter flask equipped with a stirrer is charged with 3,000 grams of 2-ethylhexanol and 125 grams of 1,5-cyclooctadiene. The contents of the flask are then held at room temperature during the dropwise addition over a two-hour period of a solution of 375 grams of bromine in 1,000 grams of 2-ethylhexanol. Work up of the reaction mixture as in Example I yields both the tribromomonoether and the dibromodiether.

EXAMPLES VII–XIV

In each of the examples in the following table, the designated flame retardant plasticizers and organic polymers are blended for thirty minutes in a double ribbon blender, extruded and pelletized. Test bars are then produced by injection molding and measurements made of impact strength at 0° C. and resistance to flame propagation. The samples are then immersed in water at 95° C. for 100 hours and the measurements of impact strength and flame resistance repeated. In no case is more than a minor difference detectable.

TABLE I

| Ex. | Additive | Weight of additive (g.) | Polymer | Weight of polymer (g.) |
|---|---|---|---|---|
| VII | Ethoxy-tribromocyclooctane. | 2 | H.D. polyethylene. | 98 |
| VIII | do | 5 | do | 95 |
| IX | Diethoxy-dibromocyclooctane. | 3 | Polymethylmethacrylate. | 97 |
| X | Ethoxy-pentabromodecane. | 2 | Polypropylene | 98 |
| XI | Ethoxy-pentabromocyclododecane. | 2 | do | 98 |
| XII | Diethoxy-tetrabromocyclododecane. | 3 | Polystyrene | 97 |
| XIII | Triethoxy-tribromocyclododecane. | 2 | Polyvinyl chloride. | 98 |
| XIV | Di(2-ethylhexoxy)-dibromocyclooctane (6%). Plus (2-ethylhexoxy)-tribromocyclooctane (94%). | 2 | do | 98 |

I claim:
1. An organic polymer composition containing a flame-retardant amount of a compound corresponding to the formula $Br_a$—R—$(OR')_b$ wherein R is a cycloalkyl group containing 5–16 carbon atoms, R' is an alkyl group containing 1–8 carbon atoms, $a$ is an integer of 2–7, $b$ is an integer of 1–4, the ratio of $a$ to $b$ is at least one, and the sum of $a$ and $b$ is an even integer of 4–8.

2. The composition of claim 1 wherein $b$ is at least two.

3. The composition of claim 1 wherein $b$ is one.

4. The composition of claim 3 wherein R is a cycloalkyl group containing 8–12 carbon atoms.

5. The composition of claim 4 wherein R is cyclododecyl and the sum of $a$ and $b$ is 6.

6. The composition of claim 4 wherein the flame retardant is an alkoxytribromocyclooctane having 1–8 carbon atoms in the alkoxy group.

References Cited
UNITED STATES PATENTS

| | | | |
|---|---|---|---|
| 2,683,749 | 7/1954 | Patrick | 260—614 R |
| 3,075,944 | 1/1963 | Wick et al. | 260—41 |
| 3,419,518 | 12/1968 | Mahling et al. | 260—41 |

MORRIS LIEBMAN, Primary Examiner

J. H. DERRINGTON, Assistant Examiner

U.S. Cl. X.R.

106—15 FP; 260—45.7 R